US009734928B2

(12) United States Patent
Kang et al.

(10) Patent No.: US 9,734,928 B2
(45) Date of Patent: Aug. 15, 2017

(54) METHOD FOR PREPARING SILICON OXIDE-CARBON COMPOSITE FOR NEGATIVE ELECTRODE OF LITHIUM SECONDARY BATTERY

(71) Applicant: Kongju National University Industry-University Cooperation Foundation, Gongju-si, Chungcheongnam-do (KR)

(72) Inventors: Yong Mook Kang, Seoul (KR); Young Min Lee, Incheon (KR); Kyeong Se Song, Ansan-si (KR)

(73) Assignee: Kongju National University Industry-University Cooperation Foundation, Chungcheongnam-do (KR)

(*) Notice: Subject to any disclaimer, the term of this patent is extended or adjusted under 35 U.S.C. 154(b) by 822 days.

(21) Appl. No.: 13/629,801

(22) Filed: Sep. 28, 2012

(65) Prior Publication Data
US 2013/0075667 A1 Mar. 28, 2013

Related U.S. Application Data

(60) Provisional application No. 61/692,715, filed on Aug. 24, 2012.

(30) Foreign Application Priority Data

Sep. 28, 2011 (KR) .................. 10-2011-0098562

(51) Int. Cl.
*H01M 4/88* (2006.01)
*H01B 1/04* (2006.01)
(Continued)

(52) U.S. Cl.
CPC .............. *H01B 1/04* (2013.01); *C01B 33/113* (2013.01); *H01M 4/133* (2013.01); *H01M 4/364* (2013.01);
(Continued)

(58) Field of Classification Search
CPC ......... H01M 4/48; H01M 4/362; B82Y 30/00; H01B 1/04; C01B 33/113
(Continued)

(56) References Cited

U.S. PATENT DOCUMENTS

2006/0275668 A1* 12/2006 Peres et al. ............... 429/231.8
2009/0029256 A1* 1/2009 Mah et al. ................. 429/231.8

FOREIGN PATENT DOCUMENTS

| JP | 2000-243396 | * | 9/2000 | ............. H01M 4/58 |
| KR | 2010-0090377 A | * | 8/2010 | ............. B82B 3/00 |
| KR | 101042009 B1 | | 6/2011 | |

* cited by examiner

*Primary Examiner* — Khanh Tuan Nguyen
(74) *Attorney, Agent, or Firm* — The PL Law Group, PLLC

(57) ABSTRACT

A method of preparing a silicon oxide ($Si_x$)-carbon composite for a negative-electrode active material of a lithium secondary battery, includes mixing silicon (Si) particles and a polymer material with an organic solvent, thus preparing a mixture solution, optionally electrospinning the mixture solution thus preparing a composite having a one-dimensional structure, and heat-treating the mixture solution or the composite having a one-dimensional structure. The silicon oxide ($SiO_x$)-carbon composite can reduce volume expansion upon lithium ion insertion and can increase ionic conductivity and electronic conductivity and thus can maintain high capacity, making it possible to apply it to a lithium ion battery to thus improve electrochemical characteristics of the battery.

8 Claims, 3 Drawing Sheets

(51) Int. Cl.
*C01B 33/113* (2006.01)
*H01M 4/133* (2010.01)
*H01M 4/36* (2006.01)
*H01M 4/48* (2010.01)
*H01M 4/587* (2010.01)
*H01M 10/052* (2010.01)

(52) U.S. Cl.
CPC ........... *H01M 4/483* (2013.01); *H01M 4/587* (2013.01); *H01M 10/052* (2013.01); *Y02E 60/122* (2013.01)

(58) Field of Classification Search
USPC ............. 252/182.1; 429/231.8, 218.1, 231.1; 428/570
See application file for complete search history.

METHOD FOR PREPARING SILICON OXIDE-CARBON COMPOSITE FOR NEGATIVE ELECTRODE OF LITHIUM SECONDARY BATTERY

CROSS-REFERENCE TO RELATED APPLICATION

This application claims priority under 35 U.S.C. §119 to Korean patent application KR10-2011-0098562, filed Sep. 28, 2011, and also claims the benefit of U.S. Provisional Application No. 61/692,715, filed Aug. 24, 2012, the disclosures of which are incorporated herein by reference.

BACKGROUND

1. Field of the Invention

The present invention relates to a method of preparing a negative-electrode active material of a lithium secondary battery, and more particularly to a method of preparing a silicon oxide ($SiO_x$)-carbon composite as a negative-electrode active material of a lithium secondary battery.

2. Description of the Related Art

Secondary batteries are being used as large power storage batteries for electric vehicles or battery power storage systems and small high-performance energy sources for portable electronic devices such as mobile phones, camcorders, notebooks, etc. In order to reduce the size of portable electronic devices and attain long-term continuous use thereof, secondary batteries able not only to achieve lightness of parts and low power consumption but also to ensure high capacity despite being small are required.

Recently, in the market related to secondary batteries, the development of a negative-electrode active material which enables a large size, high capacity and high performance has become essential, in order to serve in portable electronic devices and information communication devices, and also in energy storage devices for hybrid vehicles (HEV or PHEV) or power generation systems.

However, a highly crystalline carbon-based active material that is commercially available as a negative-electrode active material for a conventional secondary battery has a limited theoretical capacity of 372 mAh/g despite having superior characteristics as active materials for batteries. Hence, the development of a non-carbon-based negative-electrode active material is essential to manufacture high-capacity and high-performance lithium secondary batteries.

In the non-carbon-based negative-electrode active material, silicon (Si) has a high discharge capacity of 4,200 mAh/g and a very low lithium reaction potential of 0.4 V (Li/Li$^+$), and is thus known to be the most appropriate for a negative-electrode material.

However, silicon is problematic because volume expansion takes place at up to 400% at a maximum upon insertion (charge) of lithium ions, and thus the capacity is not maintained, and also because of low electrical conductivity or the like, and thereby it is necessary to solve the above problems before silicon can be commercialized as a negative-electrode active material.

SUMMARY

Accordingly, the present invention has been made keeping in mind the above problems encountered in the related art, and an aspect of the present invention is to provide a method of preparing a silicon oxide ($SiO_x$)-carbon composite for a negative-electrode active material of a lithium secondary battery, which may increase ionic conductivity and electronic conductivity to thereby maintain high capacity.

Another aspect of the present invention is to provide a method of preparing a silicon oxide ($SiO_x$)-carbon composite for a negative-electrode active material of a lithium secondary battery, which may improve electrochemical characteristics of a lithium ion battery.

A further aspect of the present invention is to provide an electrode for a lithium secondary battery, which has high capacity and high efficiency, and a lithium secondary battery including the same.

In order to accomplish one or more of the above aspects, the present invention provides a method of preparing a silicon oxide ($SiO_x$)-carbon composite, including mixing silicon (Si) particles and a polymer material with an organic solvent to prepare a mixture solution; optionally electrospinning the mixture solution to obtain a composite having one-dimensional structure; and heat-treating the mixture solution or the composite having one-dimensional structure to prepare the silicon oxide-carbon composite.

According to an embodiment of the present invention, the heat-treatment is performed without electrospinning the mixture solution.

According to an embodiment of the present invention, the electrospinning of the mixture solution is performed to obtain the fibrous composite having one-dimensional structure, and then the composite is heat-treated.

The polymer material may include polyacrylonitrile, polyvinyl alcohol, polyvinylpyrrolidone, polyvinylidene fluoride, etc.

The organic solvent may include ethanol, methanol, propanol, butanol, isopropyl alcohol (IPA), dimethylformamide (DMF), acetone, tetrahydrofuran (THF), toluene, etc.

In particular, the polymer material may be polyacrylonitrile and the organic solvent to be dimethylformamide.

Also, the heat-treating may be performed via a first heat-treatment at 250~350° C. for 3~5 hours and then second heat-treatment at 500~900° C. for 1~3 hours.

Particularly, the second heat-treatment may be performed in a gas mixture environment of an inert gas and a reducible gas.

The electrospinning may be performed at a humidity of 36% or less and a temperature of 34° C. or less.

The silicon particles may be in an amount of 10 through 25 parts by weight based on 100 parts by weight of the polymer material.

The polymer material may be in an amount of 5 through 15 parts by weight based on 100 parts by weight of the organic solvent.

According to an embodiment of the present invention, a silicon oxide-carbon composite for a negative-electrode active material of a lithium secondary battery, including: a composite of silicon oxide ($SiO_x$) and carbon (C), wherein an oxidation number (x) of the silicon oxide is 0.8 to 1.6.

A weight ratio of the silicon oxide to the carbon may be 3 to 5:7 to 5.

The silicon oxide-carbon composite may have peaks at 2θ angles of 27 to 29°, 46 to 48° and 55 to 57° upon X-ray diffraction analysis.

In addition, the present invention provides an electrode including a negative-electrode active material prepared using the above method.

In addition, the present invention provides a lithium secondary battery including the above electrode.

BRIEF DESCRIPTION OF THE DRAWINGS

The above and other aspects, features and advantages of the present invention will be more clearly understood from the following detailed description taken in conjunction with the accompanying drawings, in which.

DETAILED DESCRIPTION

Figure 1:
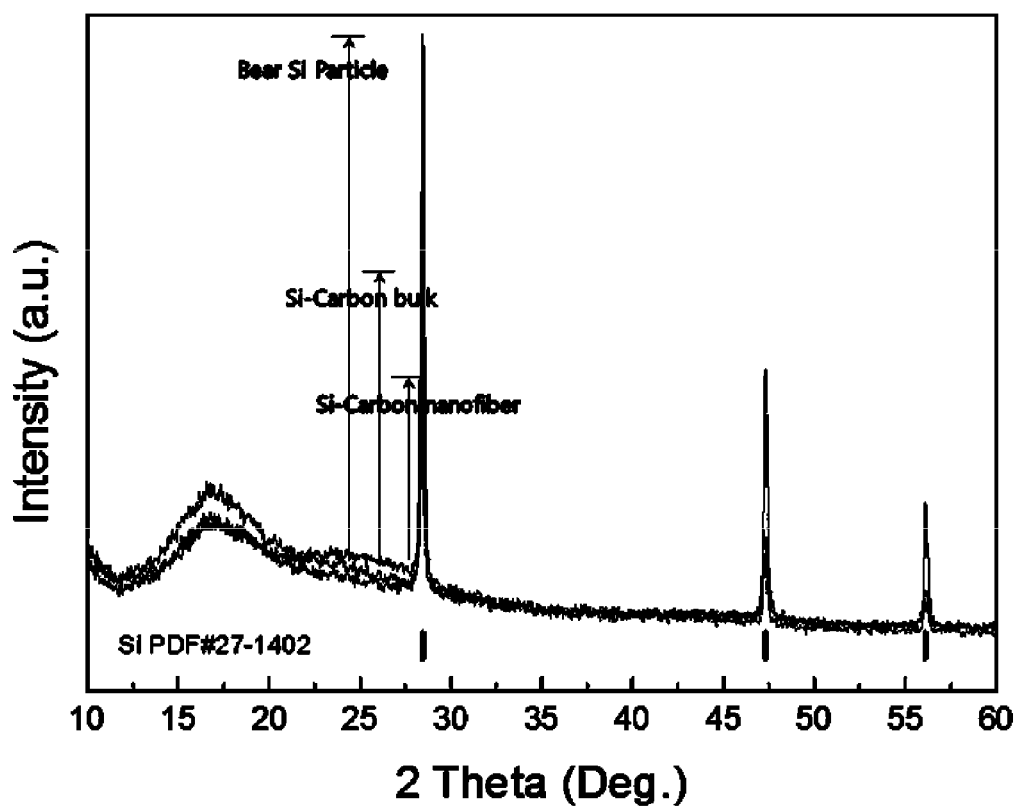
FIG. 1 illustrates X-ray diffraction analysis results of a silicon oxide-carbon composite and a silicon oxide-carbon composite having a one-dimensional structure, according to embodiments of the present invention.

Hereinafter, a detailed description will be given of the present invention.

According to an embodiment of the present invention, a method of preparing a silicon oxide ($SiO_x$)-carbon composite for a negative-electrode active material of a lithium secondary battery includes mixing silicon (Si) particles and a polymer material with an organic solvent, thus preparing a mixture solution, and heat-treating the mixture solution.

According to another embodiment of the present invention, a method of preparing a silicon oxide ($SiO_x$)-carbon composite for a negative-electrode active material of a lithium secondary battery includes mixing silicon (Si) particles and a polymer material with an organic solvent, thus preparing a mixture solution; electrospinning the mixture solution, thus forming a composite having a one-dimensional structure; and heat-treating the composite.

In the method of preparing the silicon oxide ($SiO_x$)-carbon composite for a negative-electrode active material of a lithium secondary battery as above, a sol-gel process is applied thus preparing a very viscous solution, in which the silicon particles and the polymer material are mixed. Also, heat-treatment is performed, whereby silicon is partially oxidized in concurrence with being provided in the form of a composite with carbon by carbonizing the polymer material, thus forming a silicon oxide ($SiO_x$)-carbon composite. Alternatively, the solution resulting from a sol-gel process is subjected to electrospinning and then heat-treatment thus forming a silicon oxide ($SiO_x$)-carbon composite having a one-dimensional structure, so that lithium ionic conductivity and electronic conductivity are increased and volume expansion is reduced, thereby improving electrochemical characteristics of the lithium secondary battery.

In the embodiment of the invention, the silicon oxide-carbon composite of the invention may be prepared using a sol-gel process. Concretely, the method of preparing the silicon oxide-carbon composite includes mixing silicon (Si) particles and a polymer material with an organic solvent thus preparing a mixture solution, and heat-treating the mixture solution.

The silicon particles may be those typically used in lithium secondary batteries, for example, silicon powder particles.

The silicon particles may be used in an amount of 10~25 parts by weight based on 100 parts by weight of the polymer material. If the amount of the silicon particles is less than 10 parts by weight, the amount of silicon contained in the finally prepared silicon oxide-carbon composite is low, undesirably reducing energy density as the electrode. In contrast, if the amount thereof is greater than 25 parts by weight, the silicon particles may aggregate upon preparing the silicon oxide-carbon composite, undesirably forming a severe secondary phase so that it may not effectively prevent volume expansion by carbon.

The polymer material is a carbon precursor of the silicon oxide-carbon composite, and its kind is not limited so long as it may provide carbon so that carbon is applied on the silicon oxide-carbon composite via carbonization. Examples of the polymer material include polyacrylonitrile, polyvinyl alcohol, polyvinylpyrrolidone, polyvinylidene fluoride, etc. Particularly useful is polyacrylonitrile. The polymer material may be combined with an appropriate solvent because the kind of solvent that is able to dissolve a polymer may be limited.

The polymer material is used in an amount of 5~15 parts by weight based on 100 parts by weight of the organic solvent. If the amount of the polymer material is less than 5 parts by weight, beads may be formed on the surface due to low viscosity upon electrospinning so that it may not produce fibers at a predetermined level. In contrast, if the amount thereof is greater than 15 parts by weight, the silicon particles may aggregate so that it may not control volume expansion of the silicon particles by carbon.

Examples of the organic solvent may include ethanol, methanol, propanol, butanol, isopropyl alcohol (IPA), dimethylformamide (DMF), acetone, tetrahydrofuran (THF), toluene, etc. Particularly useful is dimethylformamide when polyacrylonitrile is applied.

As mentioned above, the polymer material is dissolved in the organic solvent and then mixed with silicon powder particles, thus preparing a mixture solution. As such, the mixture solution is stirred, thereby obtaining a homogeneous solution.

The mixture solution thus obtained is then heat-treated, so that silicon particles are partially oxidized and simultaneously provided in the form of a composite with carbon via carbonization of the polymer material, resulting in a silicon oxide-carbon composite.

The heat-treatment preferably includes a first heat-treatment at 250~350° C. for 3~5 hours in an air environment, and second heat-treatment at 500~900° C. for 1~3 hours in a gas mixture environment of an inert gas and a reducible gas. More preferably, the mixture solution is primarily heat-treated at 280° C. for 5 hours, and is then secondarily heat-treated at 700° C. for 1 hour.

In the first heat-treatment, if the temperature is lower than 250° C., the organic solvent in which the polymer and the silicon particles are dissolved and moisture or the like do not sufficiently evaporate so that it may not obtain powder after heat-treatment or may form an unstable structure upon the second heat-treatment. In contrast, if the temperature is higher than 350° C., carbonization partially may proceed in a state of the organic solvent and moisture not evaporating, and thus the structure may not be maintained. Also in the second heat-treatment, if the temperature is lower than 500° C., the polymer material may not be sufficiently carbonized. In contrast, if the temperature is higher than 900° C., too many silicon particles may be oxidized and the value x may increase excessively.

As such, the inert gas may include helium (He), nitrogen ($N_2$), argon (Ar), neon (Ne), xenon (Xe), etc., and the reducible gas may include hydrogen ($H_2$).

When the heat-treatment is performed in this way, heat decomposition of the polymer material and the evaporation of the solvent may take place via the first heat-treatment, thus obtaining a gel mixture. Subsequently, when the gel mixture thus obtained is instantly subjected to second heat-treatment, silicon particles are partially oxidized and the polymer material is carbonized without influences on structural or physical characteristics, thus forming a silicon oxide-carbon composite.

In another embodiment of the invention, the method of preparing the silicon oxide-carbon composite includes mixing silicon (Si) particles and a polymer material with an organic solvent thus preparing a mixture solution, and electrospinning the mixture solution thus forming a composite having a one-dimensional structure, which is then heat-treated.

Preparing the mixture solution is the same as preparing the mixture solution in the method of preparing the silicon oxide-carbon composite according to the embodiment of the invention, and a redundant description is omitted.

The mixture solution prepared as mentioned above is subjected to electrospinning, thus preparing the composite having a one-dimensional structure.

The electrospinning process may be conducted using a typical electrospinning device, for example, an electrospinning device including a feeder for feeding a solution, a spinning nozzle for spinning the solution fed via the feeder, a collector for gathering fibers spun via the spinning nozzle, and a voltage generator for applying a voltage between the spinning nozzle and the collector.

In the present invention, the mixture solution prepared in the previous step is fed via the feeder of the electrospinning device, and is transferred into the spinning nozzle and thus spun. At this time, a (+) voltage is applied to the mixture solution, so that the spun fibers are gathered via the collector having a (−) voltage.

The electrospinning process enables the polymer material dissolved in the organic solvent to longitudinally extend in a state of enclosing silicon contained in the solution by the (+) voltage, thus forming a fiber-type material longitudinally extending in a one-dimensional structure. The electrospun fiber-type material is collected by a collector having (−) charges via an electric field. The voltage upon electrospinning may vary depending on the polymer material and the organic solvent.

The electrospinning may be performed at a humidity of 36% or less and a temperature of 34° C. or less.

The composite having a one-dimensional structure prepared using electrospinning is then heat-treated, thus obtaining a silicon oxide-carbon composite.

The descriptions for the above heat-treatment are the same as those mentioned according to the embodiment of the invention, and a detailed description thereof is omitted.

The silicon oxide-carbon composite prepared using the electrospinning process is a fiber-type composite having a one-dimensional structure, and may have a much larger specific surface area compared to that of the silicon oxide-carbon composite prepared using the sol-gel process according to the embodiment of the invention, thereby further increasing lithium ionic conductivity and electronic conductivity. Ultimately, the performance of the silicon oxide-carbon composite may be more effectively improved.

In $SiO_x$ of the silicon oxide ($SiO_x$)-carbon composite prepared as above and the silicon oxide ($SiO_x$)-carbon composite having a one-dimensional structure according to the embodiments of the present invention, x falls in the range of 0.8~1.6, and preferably 1.2~1.6, because of superior characteristics as the negative-electrode active material.

Also, in the silicon oxide ($SiO_x$)-carbon composite and the silicon oxide ($SiO_x$)-carbon composite having a one-dimensional structure prepared according to the present invention, the weight ratio of silicon oxide to carbon is not limited, but may fall in the range of 3:7~5:5 because volume expansion may be effectively reduced upon insertion (charge) of lithium ions into silicon and high capacity may be obtained.

Also, the silicon oxide ($SiO_x$)-carbon composite and the silicon oxide ($SiO_x$)-carbon composite having a one-dimensional structure prepared according to the present invention may have peaks at 2θ angles of 27~29°, 46~48° and 55~57°, and preferably 28.2~28.8°, 47 47.5° and 56~56.5° upon X-ray diffraction analysis.

A better understanding of the present invention may be obtained via the following examples which are set forth to illustrate, but are not to be construed as limiting the present invention.

EXAMPLE 1

Preparation of Silicon Oxide ($SiO_x$)-Carbon Composite Using Sol-Gel Process 0.5834 g of polyacrylonitrile was dissolved in 5 ml of dimethylformamide, and 0.1458 g of silicon powder particles were added and stirred, thus obtaining a homogeneous mixture solution.

The mixture solution was subjected to first heat-treatment at 280° C. for 5 hours in an air environment and then second heat-treatment at 700° C. for 1 hour in an $Ar/H_2$ environment, thus preparing a silicon oxide ($SiO_x$)-carbon composite.

EXAMPLE 2

Preparation of Silicon Oxide ($SiO_x$)-Carbon Composite Having a One-Dimensional Structure 0.5834 g of polyacrylonitrile was dissolved in 5 ml of dimethylformamide, and 0.1458 g of silicon powder particles were added and stirred, thus obtaining a homogeneous mixture solution.

The mixture solution was electrospun in such a manner that it was fed into a feeder of an electrospinning device, and a (+) voltage was applied when the transferred mixture solution was spun via a spinning nozzle, whereby the spun fibers were gathered via a collector having a (−) voltage, thus obtaining a fibrous composite having a one-dimensional structure.

The fiber-type composite thus prepared was subjected to first heat-treatment at 280° C. for 5 hours in an air environment and then second heat-treatment at 700° C. for 1 hour in an $Ar/H_2$ environment, thus preparing a silicon oxide ($SiO_x$)-carbon composite having a one-dimensional structure.

Test Example 1

X-Ray Diffraction Analysis

To analyze the structure of the silicon oxide ($SiO_x$)-carbon composite and the silicon oxide ($SiO_x$)-carbon composite having a one-dimensional structure prepared in Examples 1 and 2, they were subjected to X-ray diffraction analysis together with silicon (Si) nanoparticles. The results are shown in FIG. 1.

As shown in FIG. 1, the silicon (Si) nanoparticles were observed to show specific peaks at 28.442° (111), 47.302° (220), 56.121° (311). Also the silicon oxide ($SiO_x$)-carbon composite of Example 1 and the silicon oxide ($SiO_x$)-carbon composite having a one-dimensional structure of Example 2 were observed to show the specific peaks at the 2θ angles as in the silicon nanoparticles.

Test Example 2

X-Ray Photoelectron Spectroscopy

Figure 2:
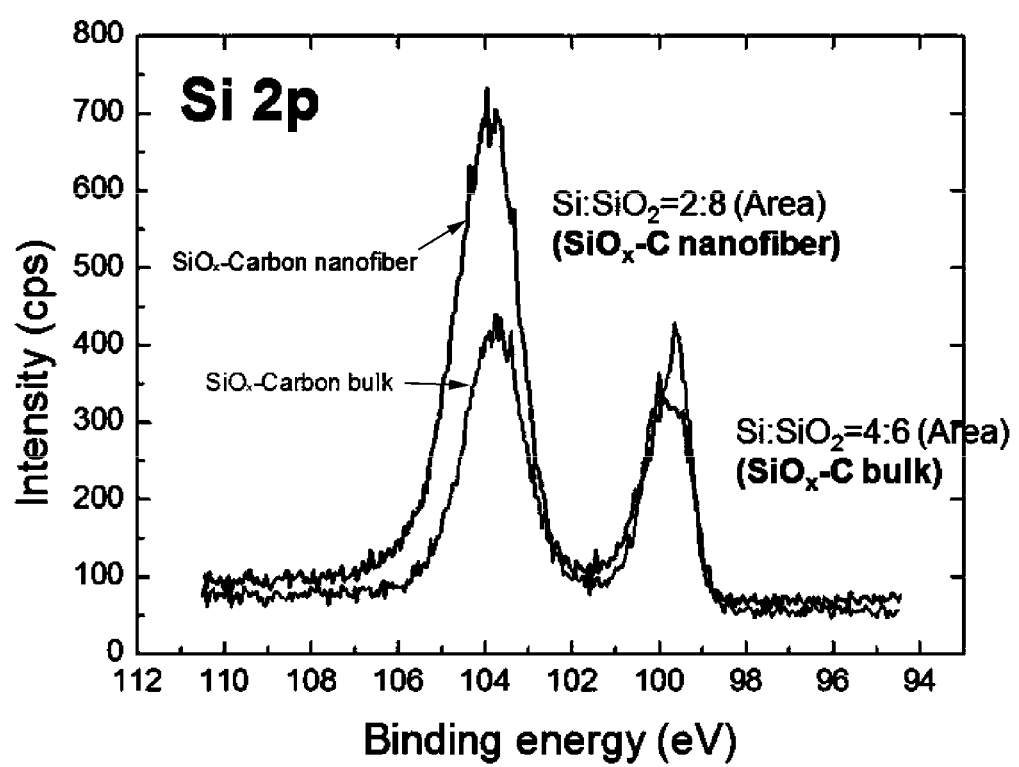
FIG. 2 illustrates X-ray photoelectron spectroscopy (XPS) results of a silicon oxide-carbon composite and a silicon oxide-carbon composite having a one-dimensional structure, according to embodiments of the present invention.

To analyze the silicon component through the oxidation number of silicon in the silicon oxide ($SiO_x$)-carbon composite and the silicon oxide ($SiO_x$)-carbon composite having a one-dimensional structure prepared in Examples 1 and 2, X-ray photoelectron spectroscopy (XPS) was conducted. The results are shown in FIG. 2.

Typical silicon and silicon oxide are present in the form of $Si^0$ in which the oxidation number is zero at about 99.5 eV, namely, in a state of silicon not being coupled with oxygen or another material. In the case of the silicon oxide ($SiO_x$)-carbon composite of Example 1 and the silicon oxide ($SiO_x$)-carbon composite having a one-dimensional structure of Example 2 according to the embodiments of the present invention, as shown in XPS results of FIG. 2, not only SiO but also $SiO_2$ in a $Si^{4+}$ state can be seen to be present at about 103.8 eV.

In the silicon oxide ($SiO_x$)-carbon composite of Example 1 and the silicon oxide ($SiO_x$)-carbon composite having a one-dimensional structure of Example 2, the ratio of silicon to oxygen was seen that the value x of $SiO_x$ was in the range of 1.2~1.6.

Test Example 3

Charge-Discharge Curve and Coulombic Efficiency Analysis

Into a half battery manufactured using the negative-electrode active material, lithium was inserted (charged) with constant current at C/20 and constant voltage at C/100 up to 0.05 V upon first charge and then released (discharged) at C/20 up to 1.5 V, after which charge-discharge cycling was conducted between 0.05 and 1.5 V at C/5 from the second cycle. The discharge capacity results of the charge-discharge characteristics are shown in FIG. 3.

Figure 3:
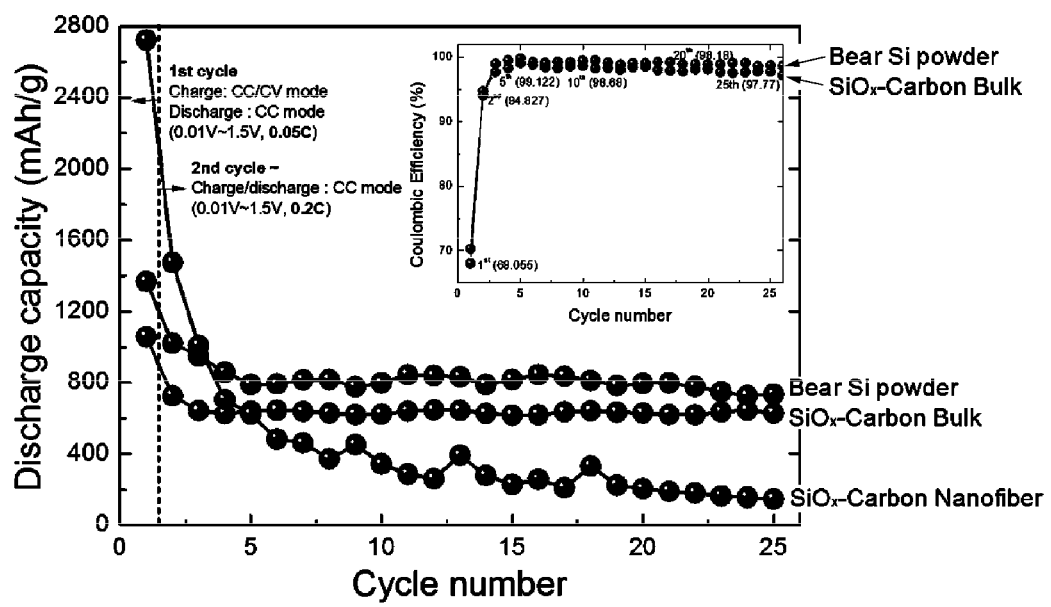
FIG. 3 illustrates discharge capacity results of a silicon oxide-carbon composite and a silicon oxide-carbon composite having a one-dimensional structure, according to embodiments of the present invention.

As shown in FIG. 3, upon first discharge, the silicon particles exhibited a high capacity approximating 2800 mAh/g, but as the charge-discharge cycling was repeated, the capacity was drastically reduced and became close to zero. However, the silicon oxide-carbon composite of Example 1 and the silicon oxide-carbon composite having a one-dimensional structure of Example 2 according to the present invention manifested lower capacity than that of the silicon particles upon first discharge, but as the charge-discharge cycling was repeated, high capacity was maintained.

Therefore, compared to the silicon (Si) nanoparticles, the silicon oxide-carbon composite of Example 1 and the silicon oxide-carbon composite having a one-dimensional structure of Example 2 prepared according to the present invention can increase electronic conductivity and ionic conductivity because of the control of oxidation number of silicon and the formation of a composite with carbon, thereby maintaining high capacity. Consequently, the silicon oxide-carbon composite of the invention can be confirmed to be adapted for a negative-electrode active material of a lithium secondary battery.

As described hereinbefore, the present invention provides a method of preparing a silicon oxide-carbon composite for a negative-electrode active material of a lithium secondary battery. According to at least one or more embodiments of the present invention, silicon is controlled in its oxidation number and is provided in the form of a composite with carbon via heat-treatment, whereby volume expansion can be reduced upon lithium ion insertion, and ionic conductivity and electronic conductivity can be increased, thus maintaining high capacity.

Also, according to the embodiments of the present invention, an electrospinning process is applied, thus manufacturing a silicon oxide ($SiO_x$)-carbon composite having a one-dimensional structure to thereby form a much larger specific surface area, so that lithium ionic conductivity and electrical conductivity can be increased, thus effectively improving performance of the silicon oxide-carbon composite.

Further, the silicon oxide ($SiO_x$)-carbon composite of the invention can be applied to a lithium secondary battery, thus increasing capacity and efficiency of the lithium secondary battery, resulting in improved electrochemical characteristics of the battery.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of preparing a silicon oxide (SiOx)-carbon composite (C) for a negative-electrode active material of a lithium secondary battery, comprising:
    mixing silicon (Si) particles and a polymer material with an organic solvent to prepare a mixture solution;
    optionally electrospinning the mixture solution to obtain a composite having one-dimensional structure; and
    heat-treating the mixture solution or the composite having one-dimensional structure to prepare the silicon oxide-carbon composite;
    wherein the heat-treating comprises a first heat-treatment at 250 to 280° C. for 3 to 5 hours and then a second heat-treatment at 500 to 700° C. for 1 to 3 hours, and
    wherein the second heat-treatment is performed in a gas mixture environment of an inert gas and a reducible gas, and
    wherein an oxidation number (x) of the silicon oxide (SiOx) is 0.8 to 1.6, and
    wherein a weight ratio of the silicon oxide to the carbon is 3 to 5:7 to 5, and
    wherein silicon oxide-carbon composite has peaks at 2θ angles of 27 to 29, 46 to 48 and 55 to 57 upon X-ray diffraction analysis.

2. The method of claim 1, wherein the heat-treatment is performed without electrospinning the mixture solution.

3. The method of claim 1, wherein the electrospinning of the mixture solution is performed to obtain the fibrous composite having one-dimensional structure, and then the composite is heat-treated.

4. The method of claim 3, wherein the electrospinning is performed at a humidity of 36% or less and a temperature of 34° C. or less.

5. The method of claim 1, wherein the polymer material comprises one selected from among polyacrylonitrile, polyvinyl alcohol, polyvinylpyrrolidone, polyvinylidene fluoride, and a combination thereof.

6. The method of claim 1, wherein the organic solvent comprises one selected from among ethanol, methanol, propanol, butanol, isopropyl alcohol (IPA), dimethylformamide (DMF), acetone, tetrahydrofuran (THF), toluene, and a combination thereof.

7. The method of claim 1, wherein the silicon particles are in an amount of 10 through 25 parts by weight based on 100 parts by weight of the polymer material.

8. The method of claim 1, wherein the polymer material is in an amount of 5 through 15 parts by weight based on 100 parts by weight of the organic solvent.

* * * * *